Dec. 31, 1940.   O. A. ROSS   2,227,201
METHOD FOR PRODUCING AND EXHIBITING SOUND MOTION PICTURES
Filed April 17, 1936   2 Sheets-Sheet 1
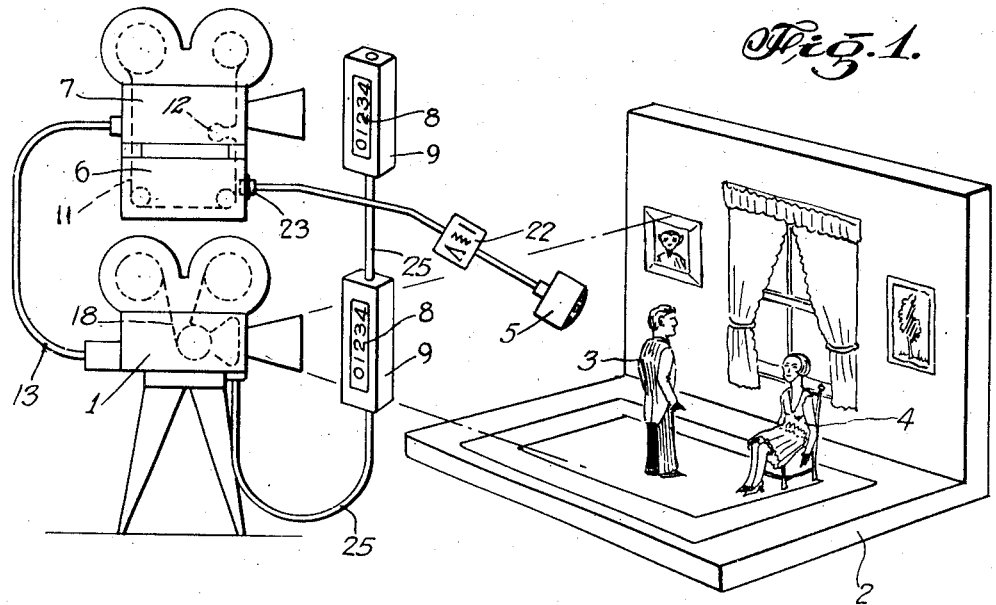
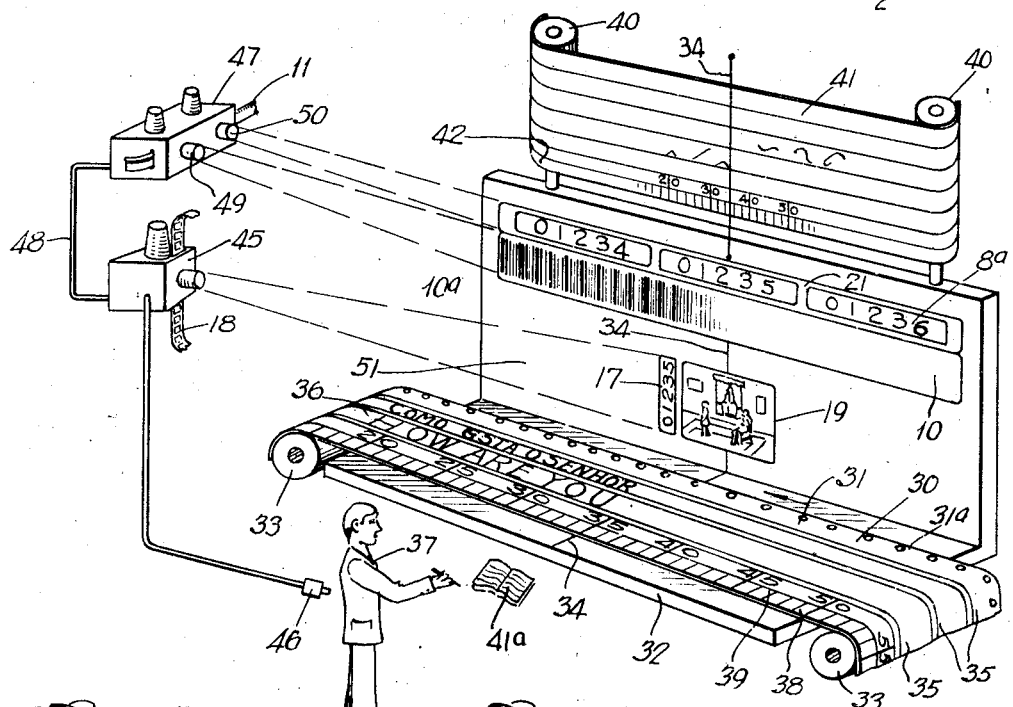
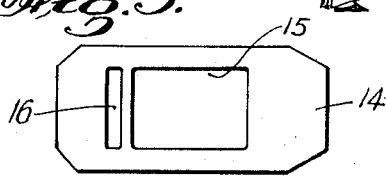
INVENTOR.
Oscar A. Ross.

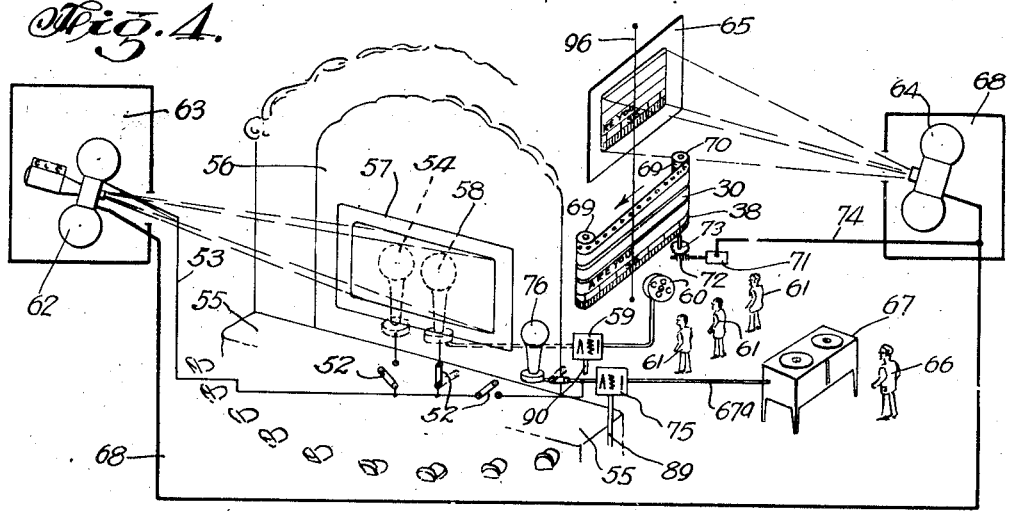
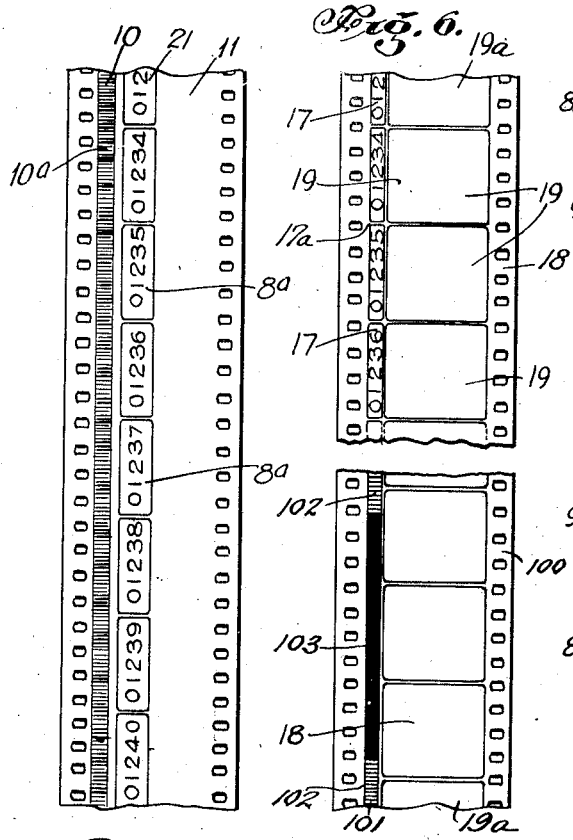
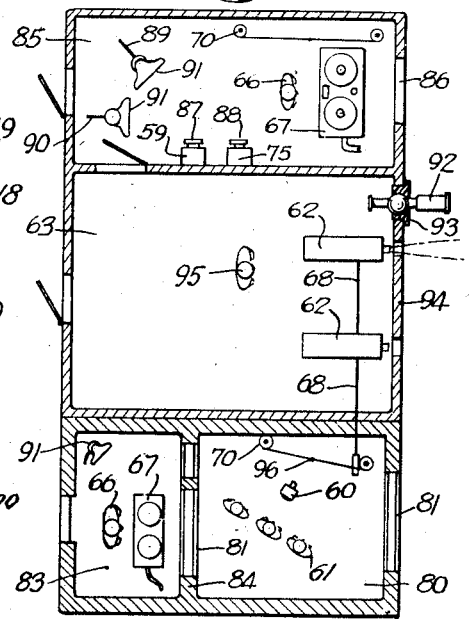

Patented Dec. 31, 1940

2,227,201

UNITED STATES PATENT OFFICE 2,227,201

METHOD FOR PRODUCING AND EXHIBITING SOUND MOTION PICTURES

Oscar A. Ross, New York, N. Y.

Application April 17, 1936, Serial No. 75,393

5 Claims. (Cl. 88—16.2)

This invention relates to methods for recording, editing, processing and exhibiting sound motion pictures, and forms a continuation in part application of my co-pending application Serial No. 386,664, filed August 17, 1929.

This invention comprehends the use of separate sound recording camera and picture recording camera for recording sound on separated sound and picture films, the sound recording camera being located remotely from the picture camera, and the sound camera being preferably fixed whereas the picture camera is preferably mobile. The sound and picture records of the separated films are thereafter recorded onto a single film.

Sound motion picture film as at present used includes a comparatively narrow sound track extending parallel to the picture track, the frames of the former silent pictures being reduced in width to permit inclusion of said sound track parallel thereto. In this invention the sound camera records sound onto a sound film, the area onto which the sound is recorded corresponding to the sound track of the single film. Adjacent to said sound track are photographically recorded successive numerals indicating the successive pictures correlated to the recorded sound. The picture camera records the pictures onto the area of the picture film corresponding to the picture track of said single film. Onto the area corresponding to the sound track of the single film are also photographically recorded successive numerals corresponding to the numerals recorded onto the index track of the sound film, the numeral indicating the picture correlated thereto being recorded immediately adjacent said picture whereas in recording the numeral on the index track of the sound film said numeral is displaced a distance of 14½ inches from the sound correlated thereto with respect to the travel of the film, this spacing being the present standard between the sound and picture gates or light apertures of present sound motion picture projectors. By thusly spacing the numerals on the index track of the sound film with respect to the portion of the sound record correlated thereto, both the sound and picture films may be cut at registering numerals with the assurance that the sound and pictures will synchronize when the single film including both the sound and picture records thereon, or films printed therefrom are projected. This invention further comprehends the production of peculiar sound motion picture exhibition films or release prints which may be projected for sound motion picture exhibition in differing languages, the dialogue only of a sound motion picture film being deleted from the sound track whereby the incidental sound or music on said sound track will be reproduced in the regular manner during projection. When this form of film is projected the dialogue is produced in the desired language independently of the sound reproduced by said sound motion picture film from which the dialogue has been deleted. The desired foreign dialogue may be reproduced from an auxiliary sound film advanced through a sound head operated in synchronism with the projector advancing the sound motion picture film or said desired foreign dialogue may be spoken by persons viewing a sound chart advanced in synchronism with said projector, the spoken dialogue being suitably amplified and reproduced by the loud speaker at the screen.

This invention further comprehends the use of the index sound and picture films for producing sound motion pictures in differing or foreign languages, the index and sound records of said sound film being projected in non-spaced or synchronous relation and in synchronism with the projection of the indexed picture record correlated thereto, analyzing the dialogue of the sound record and preparing indexed dialogue sound charts in any one or more differing languages, said sound chart being advanced for either producing a foreign dialogue during sound motion picture exhibition by reading said charts, or for producing foreign dialogue sound film to be printed or rerecorded onto the sound track of said single film from which the original dialogue thereon has been deleted for the purpose of substituting said foreign dialogue therefor.

In describing the invention in detail reference is had to the accompanying drawings wherein the applicant has illustrated embodiments of the invention, and, wherein like characters of reference designate corresponding parts throughout the several views, and in which:

Figure 1 illustrates the step of initially recording sound and action of a sound motion picture production, and Fig. 2 diagrammatically illustrates the step of composing a sound character depicting print chart or record, and Fig. 3 is a plan view of a mask, and Fig. 4 is a diagrammatic view of a motion picture theater and arrangement of apparatus for carrying out the step of exhibition, and Fig. 5 is a plan view of a portion of sound record film, and Fig. 6 is a plan view of a portion of action record film, and Fig. 7 is a plan view of a portion of sound motion picture films, and Fig. 8 is a diagrammatic view of a modified arrangement of the apparatus shown in Fig. 4.

Referring to Figs. 1 and 3, motion picture camera 1, is assumed to be photographically recording the action of set 2 having speakers or actors 3 and 4, the speech or other sound being picked up by microphones 5 and photographically recorded by sound recording camera 6, preferably formed as part of index recording camera 7 is arranged to record successive reference numerals 8 of numeral depicting apparatus, or counter 9 onto track 10 of sound film 11, advanced in said cameras. The sound recording camera 6 advances film 11 continuously whereas the index recording camera 7 advances said film intermittently and therefore a loop as 12 is formed therebetween, the distance between sound and action recording being preferably 14½ inches as a recognized standard. Cameras 6 and 7 are driven in synchronism with camera 1 by shaft 13 or other suitable drive. Cameras 6 and 7 are preferably fixed and located in space remote from the space in which the pictures are recorded.

Camera 1 is fitted in known manner with a mask as 14, having action track aperture 15 and sound track aperture 16, and a numeral depicting apparatus, as 9, is positioned whereby the numerals 8 thereof will intercept the portion of the image beam recorded by the camera objective registering with the sound aperture 16 of mask 14, whereby said numerals are photographically recorded onto track 17 of film 18 adjacently parallel to the action track 19 thereof, and as shown by Fig. 6. Camera 7 is also suitably masked, the mask having an aperture similar to aperture 16, but reduced in area and numeral depicting apparatus 9 is positioned with respect to the objective of said camera whereby the displayed numerals as 8, will be photographically recorded onto numeral depicting track 21 of film 11, see Fig. 5, camera 1 is preferably mobile to follow the action when so required.

A suitable gain or amplifying unit as 22 is arranged to amplify the modulated energy impulses produced by microphone 5 and transmitted to light valve 23 arranged to record the sound onto film 11.

The numeral 1 or index depicting apparatus 8—9 are preferably driven by camera 1 through shaft 25 whereby the numerals as 8 are advanced one character each time the films 11 and 18 are advanced one frame by cameras 1 and 7.

Referring to Fig. 2, showing a mode of composing a sound character depicting print, as 30, formed on record member 31, the table or support 32 is preferably arranged to rotatably support rollers or spools 40—40 having record tape, or ribbon member 31 wound thereon whereby said member may be advanced longitudinally across said table and relatively transversely to the center line 34 thereon. Said record member 31 is formed with sound depicting tracks, as 35—35 arranged to have depicted sound characters or words as 36—36 scribed thereon by operator 37, also a frame track scale, as 38 having frame indicating divisions 39 indicating single frame 19 of a motion picture film. Also supported by spools 40—40 rotatably supported by table 32 is the dialogue print 41 more fully described in my application Serial No. 381,793, filed July 29, 1929, maturing into Patent No. 2,147,499, granted February 14, 1939, and whereon the lines or dialogue together with such other sound characters of sound to be produced during a sound motion picture exhibition are displayed for reference purposes and in synchronism with a motion picture frame track as 42. In the absence of the dialogue print as 41, the book of lines, as 41a, of the production being revocalized may be substituted therefor.

Projector 45 of known form is arranged to advance film 18, or preferably a positive print thereof, a single frame 19 each time button 46 is depressed by operator 37, however said projector is modified to include a circuit closer arranged to also actuate projector 47 through cable 48, whereby projector 47 advances film 11 one frame each time film 18 is advanced one frame by projector 45. Or button 46 may be arranged to have two circuit closers therein whereby both of said closers are actuated to operate the projectors 45 and 47 simultaneously.

Projector 47 is similar to projector 45, however is modified to include two film advancing mechanisms, light sources and optical systems, as 49 and 50, the axes of which are preferably 14½ inches apart, at the film and converge whereby the frame portion of sound track 10 recorded onto film 11 and projected by the mechanism 49, will be synchronized with the numeral frame 8—a of the numeral track 21 as and when projected onto screen 51 by the mechanism 50. The optical systems of mechanism 49 and 50 are directed and focussed whereby the system of mechanism 50 depicts numeral frames 8a of track 21 onto screen 51 of table 32 and directly above display of the sound track 10 projected onto said screen by the optical system of mechanism 49, the center line 34 intersecting the center of each synchronous frame so displayed.

The optical system of projector 45 is arranged to project the action frames 19 and correlated numeral index frames 17 of the action film 18 onto screen 51, preferably directly below the displayed sound track 10, and whereby the center of the frames 19 register with the center line 34.

The optical systems of mechanisms 49 and 50 are preferably of a magnitude whereby the sound waves as 10a are comparatively highly magnified as compared with the action frames and therefore may be more readily analyzed for detecting the sounds produced during the recording of said waves.

The record member 31 of dialogue or sound character depicting print 30 is formed with perforations as 31a for subsequently advancing said print at a predetermined rate of travel in the presence of one or more persons for effecting the reproduction and re-recording of the sounds as more fully described in my application, Serial No. 381,793, filed July 29, 1929, maturing into Patent No. 2,147,499, granted February 14, 1939, however for the purposes of this invention it is similarly advanced as will be more fully hereinafter described.

Figure 5 shows the sound film 11 having sound record 10a recorded onto sound track 10, parallel to which has been photographically recorded index numerals 8a, for example, 01234 successively to 01240 onto index track 21. The particular section of sound record correlated to numeral 01234 is, however, recorded a distance 14½ inches away from said numeral longitudinally of the sound track. Therefore when similar numerals of the sound and picture tracks are registered for editing, printing or re-recording the sound and pictures will be properly correlated with respect to the spacing of the sound and picture apertures in present sound motion picture projectors.

Figure 6 shows the indexed picture film 18 having picture frames 19 recorded in picture track 19a. Also index numerals 01234 to 01236 photographically recorded onto the indexed track 17a, said index numerals being correlated to the similar index numerals recorded on index track 21 of sound film 11. Whereas the index numerals on sound film 11 are spaced longitudinally with respect to the portion of the sound record correlated thereto, on the picture film the index numerals corresponding to each picture are recorded immediately adjacent said picture to which they are correlated.

Figure 7 shows a sound motion picture film 100 for use in exhibiting sound motion pictures in foreign languages. For illustration this film is assumed to be a positive release print, having pictures 19 on picture track 19a. On this film the sound track 101 includes incidental or music record portions 102—102 and a dialogue portion 103, said dialogue portion being shown as blackened to cancel all reproduction of sound. This form of film is employed when the foreign dialogue is produced independently of the sound produced by film 100 during sound motion picture exhibition as more fully hereinafter disclosed. If desired non-dialogue portion 103 may have recorded thereon incidental sound or music solely for accompaniment to the foreign dialogue produced independently of the sound record on film 100 during sound motion picture exhibition.

Referring to Fig. 4, showing a sound motion picture theater having a stage 55, in the opening 56 of which is supported a motion picture screen 57, and to the rear of which are positioned one or more loud speakers, as 54 and 58 preferably supported by said screen as more fully disclosed by my Patent No. 1,990,754, granted February 12, 1935, said loud speakers being connected to amplifying or gain units as 59 arranged to amplify the modulated energy impulses picked up by the microphones as 60, as the speakers as 61—61 direct their voices thereinto. Sound motion picture projector 62 positioned in a projection booth 63 of said theater is arranged to normally project the picture of action track 19a onto screen 57 for exhibition purposes.

Sound motion picture projector 62 is arranged to drive a silent picture projector 64 in synchronism therewith, a suitable synchronizing connection as 68 connecting said projectors. Projector 64 is arranged to project a duplicate film 18 onto screen 65 positioned within view of the speakers as 61—61 and the operator 66 attending the musical sound reproducing instrument, or phonograph as 67, of known form, or said projector may if desired project a photographic record of the dialogue print 30 as shown and more fully described in my application Serial No. 381,793, filed July 29, 1929, maturing into Patent No. 2,147,499, granted February 14, 1939. Sound motion picture projector 62 is also arranged to reproduce the sound record of film 100 said reproduced sound being suitably amplified before reproduction by the loud speaker 54 and/or 58, switches as 52—52 being arranged to select any one or both of said speakers for reproducing said sound at the rear of screen 57.

Also arranged to be advanced by rollers 69—69 of depicting apparatus 70 in view of speakers 61—61 and operator 66, is the dialogue or sound depicting print 30, said print being advanced by roller 69 driven by motor 71 through worm and gear 72 and 73, said motor being actuated by the synchronizing connection 68 through auxiliary connection 74 whereby the frame scale 38 of print 30 is advanced at a rate of travel synchronous with the frame travel of the films 18 or 100 as and when advanced by the projectors 62 and 64.

The musical sound producing instrument, or phonograph apparatus 67 is arranged to produce accompanying incidental music, song, or other sounds through the loud speakers as 54, 58 or 76 preferably positioned as more fully disclosed by my Patent No. 1,990,754, granted February 12, 1935, a suitable amplifying unit as 75 being arranged to control the volume of the sounds produced thereby.

Whereas the screen 65, apparatus 70, musical instrument 67, microphone 60 and the speakers as 61—61 are shown as positioned within an enclosure which may be to the rear of screen 57, where space so permits it, is preferred to position said apparatus and persons adjacent the projection booth as shown by Fig. 8, the enclosure 80 being sound proof and having a sound proof light opening 81, whereby the speakers as 61—61 may view the action projected onto screen 57, when not called upon to view the sound chart 96.

The musical instrument 67 is also preferably placed within an enclosure as 83 adjacent booth 63, also having a sound proof light window as 81 whereby the operator 66 may view the advancing print 30 and the action on screen 57. Said enclosure may form part of enclosure 80 being separated therefrom by the sound proof wall as 84 therebetween.

Where space does not permit the musical instrument 67 may be placed in an enclosure as 85, remote from enclosure 80 and a duplicate advancing apparatus as 70 placed therein for directing the operator 66. With such a separated enclosure the light opening may also permit the entrance of sound whereby the operator 66 may adjust the amplifying or gain unit 59 and 75 by rotating the handles 87 and 88, or if the light opening is sound proof, suitable monitor speakers as 91—91 connected to said amplifying units may be placed in enclosures 83 and 85 whereby the volume of speakers 54—58 and 76 may be properly adjusted.

Telescope or optical device 92 adjustably supported by socket member 93 secured to wall 94 of booth 63, is arranged to be directed onto screen 57 whereby the projectionist 95 may at any time determine the sharpness of focus of the image projected onto said screen.

Sound charts 30 and 41 are preferably formed of translucent material. When completed said charts are utilized for making prints to be advanced by apparatus 70 for reproducing dialogue and other sounds to be accompanied to the pictures projected by release print 100 during exhibition.

Whereas sound charts 30 and 41 are shown as produced by analysis of the sound record 10 these charts may be made by analysis of action from observing projected motion pictures, or by joint analysis of projected pictures and projection of said sound record.

Sound charts 30 and 41 are preferably of a length equal to the entire feature or picture to be exhibited and suitable starting and stopping notations are placed on said charts indicating when each of the several films, making up a feature picture, are to be started and stopped, it being assumed that the projectionist assists in producing the dialogue or incidental sounds to be reproduced independently of projector 62, suitable starting marks being placed at the starting end of the films from which the film is started when the projector is placed in operation as indicated by said sound charts.

As charts 30 or 41 are advanced and the words intersect said guide line 96, the speakers 61—61 speak the lines into the microphone 60 and simultaneously they are reproduced by the loud speakers as 58, to the accompaniment of and in synchronism with the exhibited action, said speech being of a highly refined form of transmitted wave energy. Simultaneously the operator 66 receives his cues from said advancing charts and manipulates the instrument 67 accordingly to reproduce musical selections to the accompaniment of the projected action, it being preferable to continually supply musical accompaniment, reducing the volume thereof during the dialogue periods and increasing the volume to normal during the periods said dialogue is absent providing said musical selections are not being reproduced by sound motion picture projector 62, the sound volume being faded in and out between successive scenes as disclosed in my Patent No. 1,929,518 issued October 10, 1933.

Whereas the dialogue portion 103 on sound track 101 of sound motion picture film 100 may be blackened to cancel reproduction of the dialogue, said portions may have incidental sound or accompanying music recorded thereon for reproduction to the accompaniment of the independently reproduced foreign dialogue during exhibition, or said portions may have the foreign dialogue recorded thereon solely or may include both said foreign dialogue and the incidental sounds or music for accompaniment thereto. The foreign dialogue may be printed on said portions 103 from indexed sound prints onto which said foreign sound is recorded by observing the advanced sound charts 30 or 41 or by observation of the indexed projected pictures 19. After the preparation of said last named indexed sound film the sound thereon together with the incidental sound of film 11 is printed or rerecorded onto a new indexed sound film whereafter said last named film together with the indexed picture record are synchronously printed or rerecorded onto a single sound motion picture film from which duplicate prints may be made for use in exhibiting the original feature as a feature in which the dialogue will be reproduced in a suitable foreign language, the incidental sounds and the picture appearing as originally recorded. The recording of the foreign dialogue onto an indexed sound film may be carried out as disclosed in my Patent No. 1,929,519 issued October 10, 1933.

Whereas the readers 61 are shown as being guided by the advanced chart 30, upon becoming skilled the apparatus 70 and chart 30 may be dispensed with, said readers producing the dialogue from a script receiving their cue by observing the projected pictures on screen 57.

Where projectors 62 are equipped for sound the musical instruments 67 may also be dispensed with, since the incidental music will be reproduced by the loud speakers 54 and/or 58.

Whereas the sound reproducing enclosures as 80 have been shown as sound proof, such special structure is not ordinarily required since the speakers 61 may speak in comparatively low tones, the volume of which is suitably amplified before being reproduced by the speakers 54 and/or 58.

It is pointed out that when readers 61 produce the dialogue amplified through the loud speakers 51 and/or 58 a more faithful reproduction of human voices is obtained since all ground noises associated with reproduction from film or disc are eliminated. Furthermore, by reproducing the dialogue and incidental sounds separately each may be varied in volume or place if it is found that the original combination is in any way unsatisfactory during exhibition.

As shown by chart 41 the dialogue may be recorded in shorthand thereby materially reducing the length of said chart.

If desired the charts as 30 or 41 may be photographically recorded onto motion picture film, the frame travel track scale 38 being advanced synchronously with the frame travel of the recording film, whereafter prints of said film may be projected by projector 64 for observation by speaker 61.

Whereas the initial recording of both sound and action has been shown onto separated films the recording of sound may be omitted and the dialogue prints as 30 and 41 may be prepared from observing the projection of the action, the book of lines or script as 41a, or the actors themselves furnishing the clues to the spoken words or lines.

Charts 30 and 41 may also be prepared by reproducing the dialogue on sound film 11 after the recording thereof, the operator 37 recording the original reproduced dialogue in shorthand on chart 41 whereafter the foreign interpretations of said dialogue are recorded onto parallel lines of said chart in synchronism with the original dialogue as recorded in shorthand whereafter the shorthand recording of the dialogue in a foreign language may be rerecorded in longhand in said foreign language onto a chart 30.

This application forms a continuation in part application of my copending application Serial No. 386,664, filed August 17, 1929.

The methods above illustrated and described should be construed merely as typical and not as limiting the invention, the scope of which is defined in the appending claims.

What I claim is:

1. The method of producing sound motion picture films in differing languages which involves, photographically recording correlated motion pictures and variably spaced variable length native word sequences onto separate sound and picture films, projecting said picture record and the sound wave record of said word sequences synchronously, recording foreign word sequences corresponding in length and spacing to said projected sound wave sequences onto a sound chart, advancing said chart and a foreign version sound film synchronously, vocally producing sound in accord with the foreign word sequences on said advancing chart simultaneously with recording said sound onto said foreign version film and combining said picture record and said foreign word sequence film record synchronously onto a common sound motion picture film.

2. The method of producing sound motion picture films in differing languages which involves, photographically recording correlated motion pictures and variable length variably spaced native word sequences onto separate picture and sound films, projecting the sound wave record of said sound film, recording foreign word sequences corresponding in length and spacing to said projected record onto a sound chart, advancing said chart and a foreign version sound film synchronously, vocally producing sound in accord with the foreign word sequences on said advancing chart simultaneously with recording said sound onto said foreign version film, and combining said picture film record and said foreign version film record synchronously onto a common sound motion picture film.

3. The method of producing sound motion picture films in differing languages which involves, photographically recording correlated motion picture and variable length variably spaced native word sequences onto separate picture and sound films, observing the sound wave record on said sound film and recording foreign word sequences onto a sound chart synchronously with said sound film record, advancing said chart and a foreign version sound film synchronously, vocally producing sound in accord with the foreign word sequences on said advancing chart simultaneously with recording said sound onto said foreign version film, and combining said picture film record and said foreign version film record synchronously onto a common sound motion picture film.

4. The method of producing sound motion picture films in differing languages which involves, photographically recording correlated motion picture and variably spaced variable length native word sequences and musical sequences onto separate films, projecting the picture record and the sound wave record of said word sequences synchronously, recording foreign word sequences corresponding in length and spacing to said projected sound wave sequences onto a sound chart, advancing said chart and a foreign version sound film synchronously, vocally producing foreign word sequences in accord with said advancing chart simultaneously with recording said sequences onto said foreign version film, and combining said picture film record, said music film record and said foreign version film record synchronously onto a common sound motion picture film.

5. The method of producing sound motion picture films in differing languages which involves, photographically recording correlated motion picture and variable length variably spaced native word sequences onto separate picture and sound films, photographically recording selected musical or incidental sound sequences onto a music film for accompaniment to said picture and word sequences, projecting the sound wave record of said word sequence film, recording foreign word sequences corresponding in length and spacing to said projected sound wave sequences onto a sound chart, advancing said chart and a foreign version sound film synchronously, vocally producing sound in accord with the foreign word sequences on said advancing chart simultaneously with recording said sequences onto said foreign version film, and combining said picture film record, said music film record and said foreign version film record synchronously onto a common sound motion picture film.

OSCAR A. ROSS.